United States Patent [19]
Narita et al.

[11] Patent Number: 5,694,580
[45] Date of Patent: Dec. 2, 1997

[54] METHOD OF CONVERTING DATA AND DEVICE FOR PERFORMING THE METHOD

[75] Inventors: Masahiko Narita; Akiyoshi Katsumata; Makiko Shimamura; Akiro Nagatome; Masaki Satoh, all of Kawasaki, Japan

[73] Assignee: Fujitsu Limited, Kawasaki, Japan

[21] Appl. No.: 257,201

[22] Filed: Jun. 9, 1994

[30] Foreign Application Priority Data

Sep. 1, 1993 [JP] Japan .................. 5-217663

[51] Int. Cl.$^6$ .............. G06F 5/00; G06F 13/14; H03M 7/00
[52] U.S. Cl. ............ 395/500; 395/200.18; 370/400; 370/466
[58] Field of Search .............. 395/500, 200.01, 395/200.18, 650, 600; 360/48; 370/61, 400, 466; 364/239.3, 200

[56] References Cited

U.S. PATENT DOCUMENTS

| | | | |
|---|---|---|---|
| 4,054,947 | 10/1977 | Shanks et al. | 364/900 |
| 4,535,421 | 8/1985 | Duwel et al. | 395/250 |
| 4,599,611 | 7/1986 | Bowker et al. | 340/721 |
| 4,642,791 | 2/1987 | Mallozzi et al. | 364/900 |
| 4,754,428 | 6/1988 | Schultz et al. | 395/200.18 |
| 4,827,446 | 5/1989 | Kawamura et al. | 364/900 |
| 4,855,905 | 8/1989 | Estrada et al. | 395/500 |
| 4,979,169 | 12/1990 | Almond et al. | 370/99 |
| 5,119,465 | 6/1992 | Jack et al. | 395/500 |
| 5,124,909 | 6/1992 | Blakely et al. | 395/200.18 |
| 5,257,016 | 10/1993 | Fujii et al. | 345/143 |
| 5,274,470 | 12/1993 | Karita et al. | 358/448 |
| 5,339,435 | 8/1994 | Lubkin et al. | 395/700 |
| 5,345,586 | 9/1994 | Hamala et al. | 395/650 |
| 5,381,534 | 1/1995 | Sho | 395/650 |
| 5,388,013 | 2/1995 | Nakamura | 360/48 |
| 5,406,557 | 4/1995 | Baudoin | 370/61 |
| 5,408,607 | 4/1995 | Nishikawa et al. | 395/200 |
| 5,416,917 | 5/1995 | Adair et al. | 395/500 |
| 5,442,749 | 8/1995 | Northcutt et al. | 395/500 |
| 5,513,323 | 4/1996 | Williams et al. | 395/500 |

FOREIGN PATENT DOCUMENTS

| | | |
|---|---|---|
| 61-196645 | 8/1986 | Japan . |
| 3-110653 | 5/1991 | Japan . |
| 3-268643 | 11/1991 | Japan . |

OTHER PUBLICATIONS

Hunter, B. "Conversion of Documents to and from SGML", IEEE, 1994, pp. 5/1–5/4.

Huang, L. et al., "Communicating Abstract Data Type Values in Heterogeneous Distributed Programs", IEEE, 1994, pp. 458–465.

Abidi, A., "Trends in High Performance Data Conversion", 1993, pp. 329–330.

*Primary Examiner*—Kevin J. Teska
*Assistant Examiner*—Tyrone V. Walker
*Attorney, Agent, or Firm*—Staas & Halsey

[57] ABSTRACT

A data conversion apparatus includes a plurality of computers connected to a network, a storage section, a retrieval section, data conversion processing sections, and a control section. The storage section stores plural sorts of information on the converter including a name of a computer equipped with a converter, a way of using the converter. A retrieval section retrieves information on the subject converter from the storage section according to a conversion request from a computer which requesting data conversion. The data conversion processing sections are connected to the respective computers and converts data into data of a format to be used with the converter on the basis of the result retrieved by the retrieval section. The control section controls the retrieval processing of the retrieval section and the conversion processing of the data conversion processing section to output converted data to the computer which requests data conversion.

17 Claims, 13 Drawing Sheets

FIG.4

| NO | NAME OF DATA TO BE CONVERTED | NAME OF CONVERTED DATA | CONVERSION COMMAND NAME | ASSIGNED COMPUTER | EXISTING PLACE | USE WAY |
|---|---|---|---|---|---|---|
| 1 | TIFF | GIFF | TIFF-TO-GIFF | 22-A | DIRECTORY | |
| 2 | GIFF | TIFF | GIFF-TO-FIFF | 22-B | DISC | |
| ... | | | | | | |

FIG.5

| DATA DISCRIMINATION CONDITION | DATA NAME |
|---|---|
| FIRST DISCRIMINATION CONDITION | SJIS |
| SECOND DISCRIMINATION CONDITION | EUC |
| THIRD DISCRIMINATION CONDITION | JIS |
| ... | ... |

FIG.8

| MACHINE NAME | INFORMATION NAME | CONTENTS |
|---|---|---|
| | CODE NAME | EUC |
| | DEVICE | FLOPPY DISC |
| | DISPLAY | BIT MAP DISPLAY |
| | DISPLAY COLOR | 256 COLORS |
| | IMAGE DATA | TIFF |
| | TEMPORARY RETENTION REGION | |
| ⋮ | ⋮ | ⋮ |
| | CODE NAME | SJIS |
| | DEVICE | CARTRIDGE TAPE |
| | DISPLAY | DUMB TERMINAL |
| | DISPLAY COLOR | TWO COLORS |
| ⋮ | ⋮ | ⋮ |

METHOD OF CONVERTING DATA AND DEVICE FOR PERFORMING THE METHOD

BACKGROUND OF THE INVENTION

FIELD OF THE INVENTION

The present invention relates to a method of converting data in a network into data of a format to be utilized by a user, and also to a device for achieving the method.

There has been known a distributed system for connecting a data base or a plurality of computers to a network. The distributed system performs data processing using data respective computers. Different types of computers are typically connected to the network.

In the distributed system, each file (data) list is displayed on windows so that any file may be selected from the list. For example, in the case of selecting a TIFF (Tag Image File Format) file, which is a standard image format used by personal computers, the TIFF file is displayed on the window.

In this case, the file on the personal computer may be used on UNIX over the network or a floppy disc. UNIX is a registered trademark of AT & T (American Telephone And Telegraph Company). However, in the case of using resources between different systems, there arises the following problems.

Firstly, in the personal computers, a Japanese code which is called SJIS (Shift Japanese Industrial Standard) is generally used. On the other hand, in UNIX, a Japanese code which is called EUC (Extended UNIX Code) is typically used.

Secondly, for graphics in UNIX, there is recently used the pix map format on a window control program which has been developed by the MIT (Massachusetts Industrial University) which is called X window. The graphic data of the Pixmap format is a style of a document format resolved so as to be readable with the C program language.

On the other hand, in the graphic of the personal computers, there is used a binary format called TIFF. In this case, in UNIX, since the file is displayed in the Pixmap format, it is required to prepare application software for displaying a TIFF image in order to display the TIFF file. Alternatively, the TIFF format must be converted into the Pixmap format by various convertors to display the file in X windows.

For example, a file "A" belongs to the SJIS file, and is utilized by a certain computer. In this case, when the code system of that computer is of SJIS, it is unnecessary to convert data.

However, when the code system of the computer is not of SJIS, data conversion is required. In the case where the data format is converted, a user must know the code system of the computer being used, the code system of a file to be used, and a method of using a convertor. Further, it is required that the user himself remembers the position of the computer having the convertor and comprehends the relationship between the respective data and the computer to be used.

In the case where no convertor is installed in the operator's computer, he must take the file to a computer having a convertor directly over a network. Alternatively, it is necessary to move the file over medium such as a floppy disc.

Further, in the case where the file goes through two convertors doubly, the above processing must be performed doubly. In the case where two convertors are provided separately, it is required that such environment is especially set. Alternatively, a convertor into which two convertors are combined must be especially developed.

SUMMARY OF THE INVENTION

An object of the present invention is to provide a data converting method and a data convertor for automatically converting data into data of a format to be used by means of one computer, thereby being capable of reduction in the user's work and in costs.

In the data conversion apparatus in accordance with the present invention, a plurality of computers which request data processing and data conversion are connected to a network. The data conversion apparatus converts data into data of a format to be used with a converter installed in at least one computer among a plurality of computers. The data conversion apparatus is equipped with a storage section, a retrieval section, a conversion processing section, and a control section.

The storage section stores plural sorts of information on the converter including the name of a computer equipped with the converter and the way of using the converter. The retrieval section retrieves information on the subject converter from the storage section in accordance with a conversion request from the computer which requests data conversion.

The conversion processing sections are connected to the corresponding computers, respectively, and allow the converter to convert data into data of a format to be used on the basis of the retrieval results from the retrieval section. The control section controls the retrieval processing of the retrieval section and the conversion processing of the conversion processing section. The control section outputs converted data to the computer which has requested data conversion.

In the data conversion method in accordance with the present invention, a plurality of computers which request data processing and data conversion are connected to a network. In the data conversion method, data is converted into data of a format to be used by use of a converter installed in at least one computer among the plurality of computers. The data conversion method includes a storage step, a retrieval step, a conversion step, and a control step.

In the storage step, there is stored plural sorts of information on the converter including the name of a computer equipped with the converter and the way of using the converter.

In the retrieval step, there is retrieved information on the subject converter in accordance with a conversion request from a computer which requests data conversion.

In the conversion step, there is converted data into data of a format to be used on the basis of the retrieved results by use of the converter.

In the control step, there are controlled the retrieval processing and the conversion processing to output converted data to the computer which has requested data conversion.

The storage section is formed of a data base or the like. The storage section may be provided with a converter information table and a data discrimination table. The converter information table stores information including the name of data to be converted and the name of converted data, both representing the kind of data, the name of a conversion command, an assigned computer providing the conversion command therein, an existing place, and a use way. The data discrimination table stores the correspondence of a discriminating condition for discriminating the sort of data to a data name.

The computer, which requests conversion, outputs the conversion condition for data conversion to the retrieval section. The retrieval section may include a data type judging section, a data read section, a data coincidence section, and a conversion request section.

The data type judging section judges whether there exist at least one of the type of data to be converted, the type of converted data, and a place for converted data in the conversion condition from the computer which requests conversion, or not. The data read section, when there exist the type of data to be converted and the type of converted data in the conversion condition, reads the name of data to be converted and the name of converted data from the converter information table.

The data coincidence section judges whether the name of data to be converted and the name of the converted data read by the data read section coincide with the type of data to be converted and the type of converted data requested by the conversion requesting computer, or not. The conversion request section, when the read data coincides with the requested data, reads information on the conversion command from the converter information table, and this information is used for requesting data conversion to the control section.

Further, the data conversion apparatus may include a system information table and a system information retrieval section. The system information table stores system information on a system which is constituted by the network, a plurality of computers and the like. The system information retrieval section retrieves system information from the system information table.

The system information table may store information on at least one of character codes, devices, displays, display colors, display image data formats, and temporary retention regions.

Further, the system information retrieval section may include a judging section and a information retrieval section. The judging section, when the data type judging section has judged that there exists no type of converted data, judges which type the data to be converted belongs to. The information retrieval section retrieves the contents corresponding to the judging result from the judging section from the system information table to return them to the retrieval section.

Further, the system information retrieval section may include a first region retrieval section and a second retrieval section. The first region retrieval section, when the data type judging section has judged that there is no place of converted data, retrieves a temporary retention region of the computer, which requests the conversion, from the system information table. The first region retrieval section, when the temporary retention region has been retrieved, returns the computer name and the existing place to the retrieval section.

The second region retrieval section, when the temporary retention region has not been retrieved, retrieves the temporary retention region of the computer connected to the retrieval section, to thereby return the computer name and the existing place to the retrieval section.

Furthermore, the retrieval section may include a data reference section, a data read section, a data discrimination section, and a transfer request section. The data reference section, when the data type judging section has judged that there exists no type of data to be converted, judges whether data to be converted can be referred to from the computer equipped with the retrieval section, or not. The data read section, when data to be converted can be referred to, reads data from the data discrimination table. The data discrimination section judges whether data to be converted coincides with a data discrimination condition, or not. The transfer request section, when data to be converted cannot be referred to, requests the control section to transfer data from the computer requesting data conversion to the computer equipped with the retrieval section.

Among the plurality of conversion processing sections, the conversion processing section connected to the computer with the converter may perform data conversion on the basis of the retrieved result.

The control section may include a transfer request section, a transfer judging section, a conversion request section, and a transfer request section. The transfer request section requests the conversion processing sections to transfer data to be converted to the computer having the converter. The transfer judging section judges whether transfer of data to be converted to the computer by the conversion processing section has succeeded, or not. The conversion request section, when data transfer has succeeded, requests data conversion of the conversion processing section. The transfer request section requests the conversion processing section to transfer data to the computer of a request position.

According to the present invention, the storage section stores plural sorts of information on the converter including the name of a computer having a converter and a way of using the converter. The retrieval section retrieves information on the subject converter in accordance with a conversion request from a computer which requests data conversion.

On the basis of the retrieved results, the conversion processing section allows the converter to convert data into data of a format to be used, and the control section controls the retrieval processing and the conversion processing to output converted data to the computer which has requested data conversion.

Therefore, data can be automatically converted into data of a format to be used, as the result of which the work of an user can be reduced.

BRIEF DESCRIPTION OF THE DRAWINGS

The accompanying drawings, which are incorporated in and constitute a part of this specification, illustrate embodiments of the invention, and together with the description, serve to explain the objects, advantages and principles of the invention. In the drawings.

FIG. 4 is a diagram showing a converter information table;

FIG. 5 is a diagram showing a data discrimination table;

FIG. 8 is a diagram showing a system information table;

DETAILED DESCRIPTION OF THE PREFERRED EMBODIMENTS

Hereinafter, description will be given of preferred embodiments of a data conversion apparatus and a method in accordance with the present invention with reference to the accompanying drawings.

Figure 1:
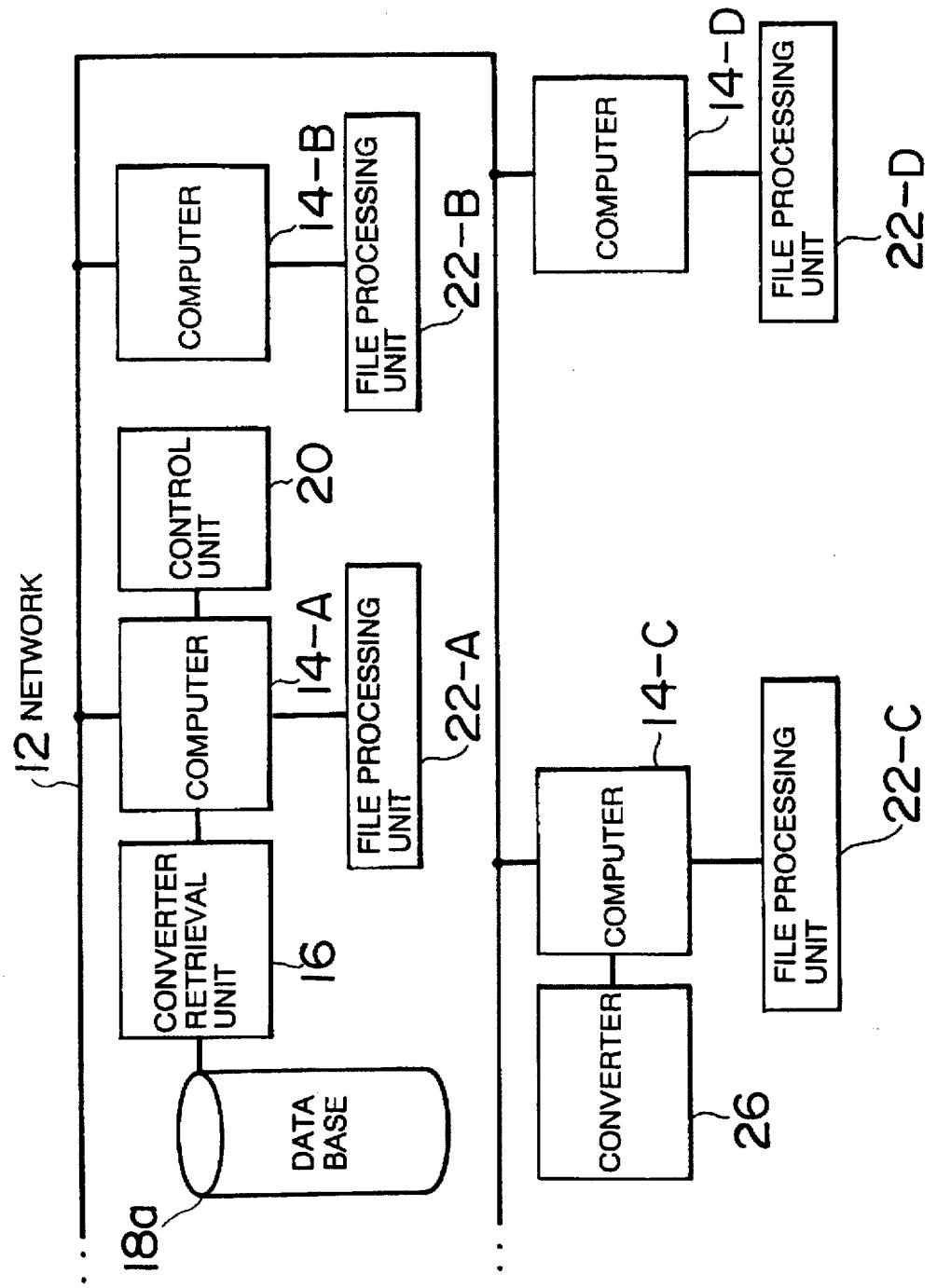
FIG. 1 is a structural block diagram showing a data conversion apparatus in accordance with a first embodiment of the present invention.

FIG. 1 is structural block diagram showing a data conversion apparatus in accordance with a first embodiment of the present invention.

(First Embodiment)

The data conversion apparatus of the first embodiment has four computers 14-A to 14-D connected to a network 12. The data conversion apparatus allows a converter 26 installed in the computer 14-C to convert data into data of a format to be used. The data conversion apparatus is equipped with a converter retrieval unit 16, a data base 18a, file processing units 22-A to 22-D, and a control unit 20.

The converter 26 preferably resides in software, but may also reside in hardware.

The data base 18a is connected to the converter retrieval unit 16. The data base 18a stores plural sorts of information on the converter 26 including the name of a computer equipped with the converter 26 and the way of using the converter 26. In the case of using data on a network, there exists various sorts of data. The data is not always of an available data format. The data base is used for retrieving the available data format when using the data.

The converter retrieval unit 16 is connected to the computer 14-A. The converter retrieval unit 16 retrieves information on the subject converter from the data base 18a in accordance with a conversion request from the computer which requests data conversion.

The file processing units 22-A to 22-D are connected to the corresponding computers 14-A to 14-D, respectively. The file processing units 22-A to 22-D allow the converter 26 to convert data into data of a format to be used on the basis of the retrieval results from the converter retrieval unit 16.

The control unit 20 is connected to the computer 14-A. The control unit 20 controls the retrieval processing of the converter retrieval unit 16 and the conversion processing of the file processing units 22-A to 22-D. The control unit 20 outputs converted data to the computer which has requested data conversion.

Figure 2:
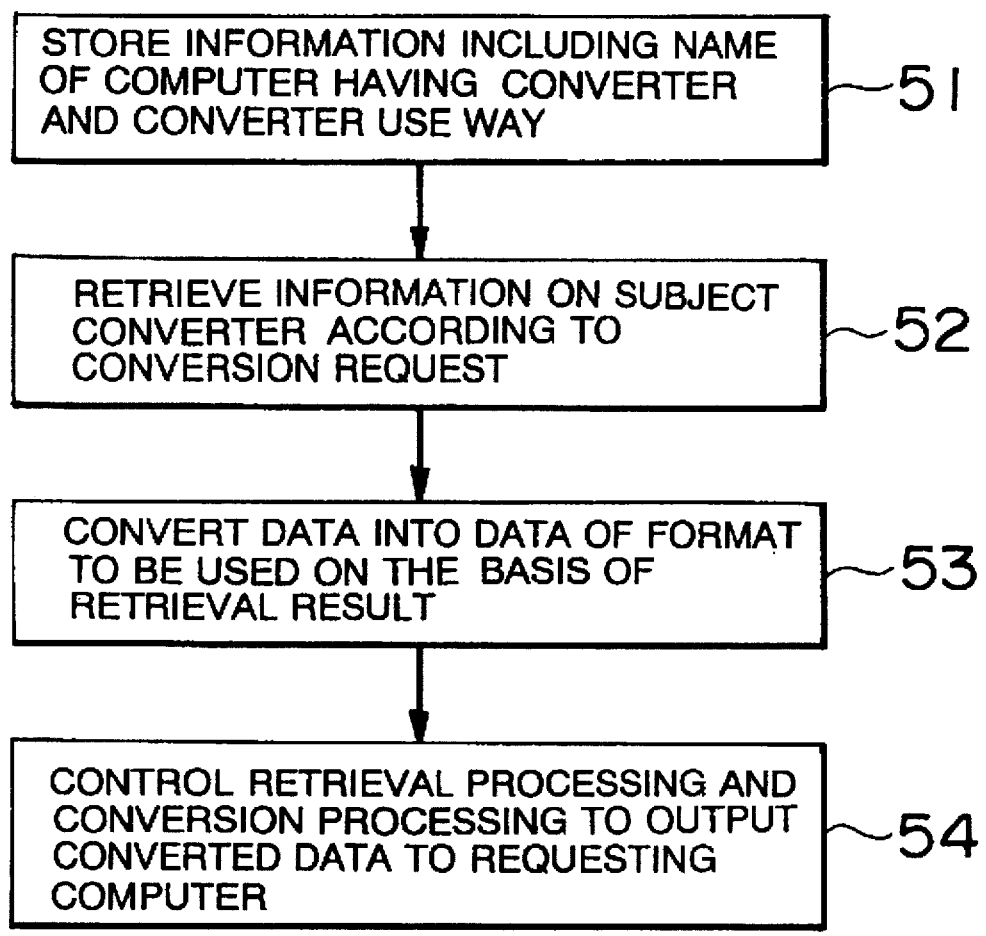
FIG. 2 is a flowchart showing a data conversion method in accordance with the first embodiment of the invention.

FIG. 2 is a flowchart showing a data conversion method in accordance with the first embodiment.

First, plural sorts of information on the converter including the name of a computer equipped with the converter and the way of using the converter is stored in the data base 18a (Step 51).

Subsequently, when a certain computer issues a conversion request for requesting data conversion, then the converter retrieval unit 16 retrieves information on the subject converter in accordance with a conversion request from a computer which requests data conversion (Step 52).

Thereafter, the file processing unit 22-C allows the converter 26 to convert data into data of a format to be used on the basis of the retrieval results from the converter retrieval unit 16. Further, the control unit 20 controls the retrieval processing and the conversion processing to output converted data to the computer which has requested data conversion (Step 54).

Therefore, the data to be converted is automatically converted into the converted data of a format to be used.

(Second Embodiment)

Figure 3:
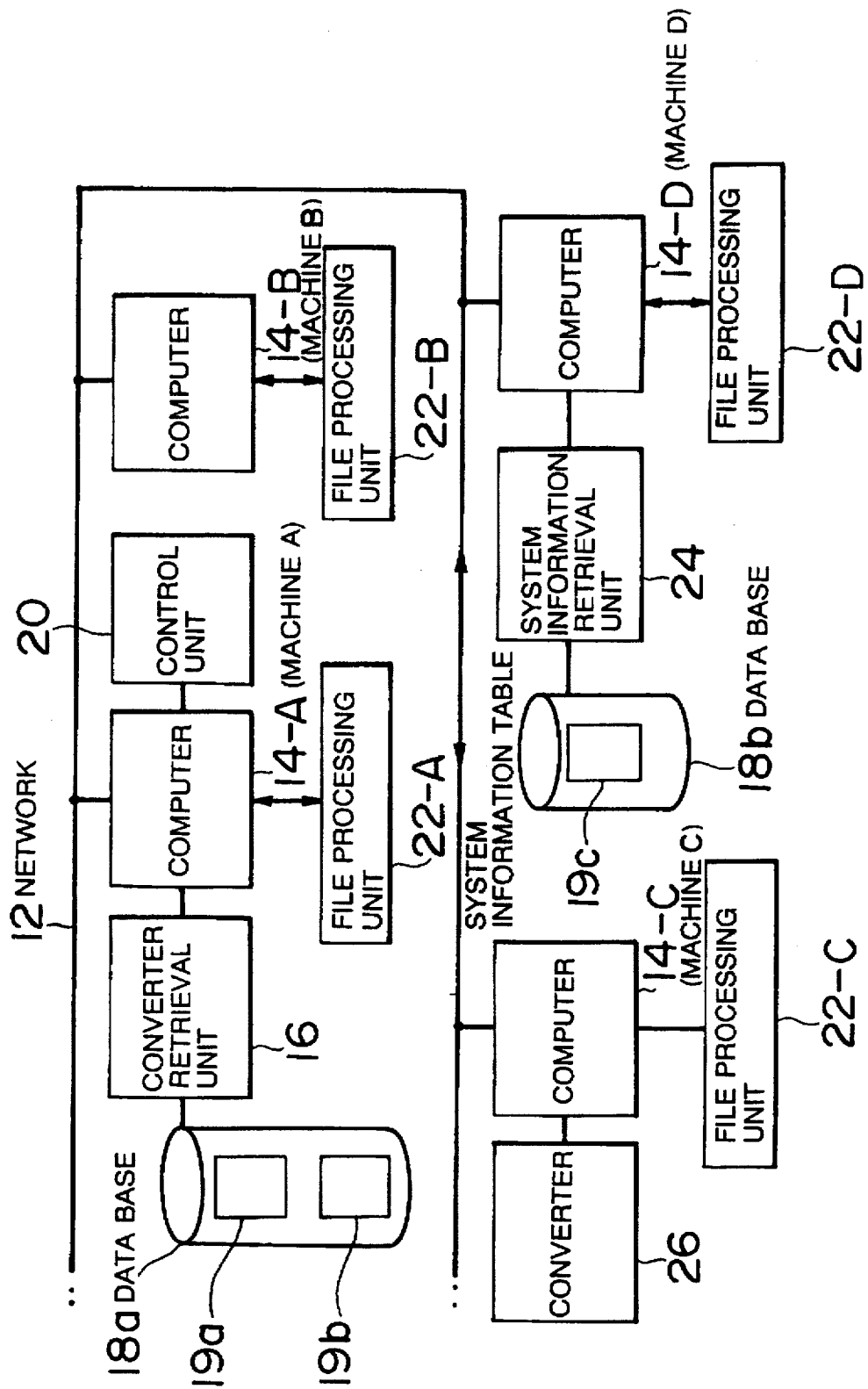
FIG. 3 is a structural block diagram showing a data conversion apparatus in accordance with a second embodiment of the invention.

A second embodiment of the present invention will be described. FIG. 3 is a structural block diagram showing a data conversion apparatus in accordance with the second embodiment of the invention. The data conversion apparatus of the second embodiment is a more definite example than that of the first embodiment. The data conversion apparatus allows a converter to convert data on a network into data of a format to be used by an user. The data conversion apparatus includes computers 14-A, 14-B, 14-C and 14-D connected to a computer network 12, respectively, data bases 18a and 18b, a converter retrieval unit 16, file processing units 22-A, 22-B, 22-C and 22-D, a control unit 20, and a converter 26.

The respective computers 14-A, 14-B, 14-C and 14-D perform data processing and also gives a data conversion request to the converter retrieval unit 16. Connected to the computer 14-C is the converter 26 which converts data to be converted into data of an appropriate data format. Connected to the computer 14-A is the converter retrieval unit 16 which is connected with the data base 18a.

The data base 18a stores information on the converter 26. The information consists of, for example, such information as the position of the converter 26, the name of the computer equipped with the converter 26, the way of using the converter 26, the contents of data conversion, or the like. The data base 18a includes a converter information table 19a and a data discrimination table 19b.

FIG. 4 is a diagram showing the converter information table 19a. The converter information table 19a stores such information as the name of data to be converted, the name of converted data, the name of a conversion command, an assigned computer, an existing place, a use way, etc.

The name of data to be converted represents a sort of data, such as TIFF, GIFF or the like. The name of converted data represents a sort of data, such as GIFF, TIFF or the like. The name of conversion command represents the name of its actual conversion command, for example, such as TIFF-TO-GIFF, GIFF-TO-TIFF or the like. The assigned computer represents the kind of computer which actually provides its conversion command therein, such as the computers 22-A, 22-B or the like. The existing place represents a directory, a disc name or the like. The use way represents the way of using a command.

FIG. 5 is a diagram showing the data discrimination table 19b which stores the correspondence of a data discriminating condition to a data name. The data discriminating condition represents a condition for discriminating the kind of data. The data name represents the name of its data. In the table shown in FIG. 5, there is stored, for example, SJIS, EUC, JIS or the like as the data name. A first discriminating condition to a third discriminating condition are stored in correspondence with these data names. The first discriminating condition represents a condition for discriminating whether data to be converted is a character code representative of SJIS or not.

Only one converter retrieval unit 16 is provided on the computer network 12 (hereinafter referred to as "network"). The converter retrieval unit 16 retrieves information to be obtained from the data base 8a which has stored information on the converter 26, and then notifies the control unit 20 of the retrieved information.

Figure 6:
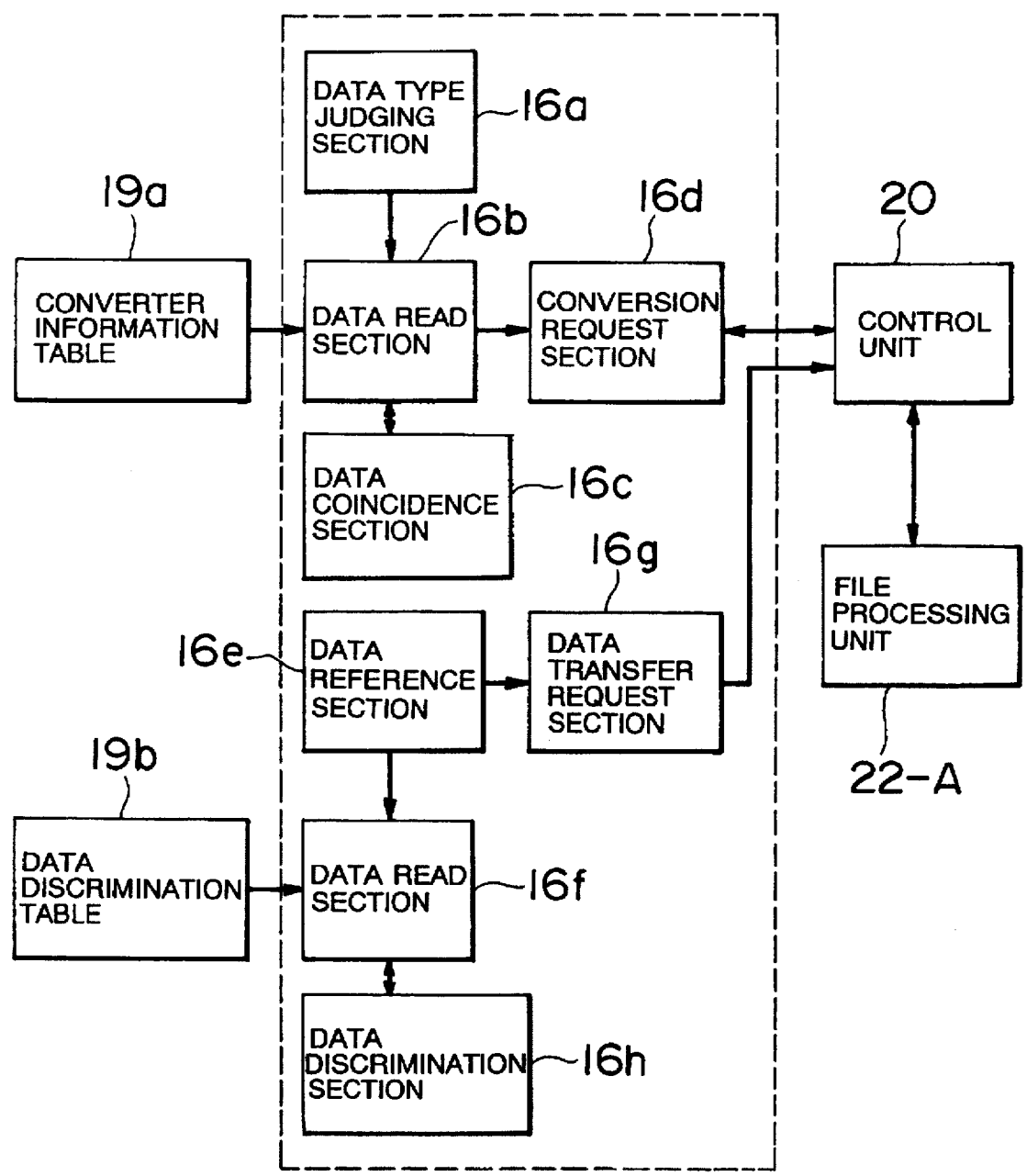
FIG. 6 is a structural block diagram showing a converter retrieval unit.

FIG. 6 is a structural block diagram showing the converter retrieval unit. The converter retrieval unit 16 includes data type judging section 16, data read section 16b, data coincidence section 16c, and a conversion request section 16d. The computer, which requests conversion, outputs conversion conditions including a type of data to be converted, a type of converted data, a place for converted data, etc. to the converter retrieval unit 16.

The data type judging section 16a judges whether there exist the type of data to be converted, the type of converted data, and a place for converted data in the conversion condition from the computer which requests conversion, or not. The data read section 16b reads information on the name of data to be converted and the name of converted data from the converter information table 19a.

The data coincidence section 16c judges whether the data to be converted and the converted data read by the data read section 16b coincide with the data to be converted and the converted data requested by the conversion requesting computer, or not. The conversion request section 16d, when the read data coincides with the requested data, reads information on the conversion command from the converter information table 19a, and this information is used for requesting data conversion to the control unit 20.

The converter retrieval unit 16 further includes a data reference section 16e, a data read section 16f, a data transfer request section 16g, and a data discriminating section 16h. The data reference section 16e, when the data type judging section 16a judges that there exists no type of data to be converted in the conversion condition, judges whether the data to be converted can be referred to from the computer connected to the converter retrieval unit 16, or not.

The data read section 16f, when data to be converted can be referred to, reads data from the data discrimination table 19b. The data judging section 16h judges whether data to be converted coincides with the data discrimination condition or not. The data transfer request section 16g, when data to be converted cannot be referred to, requests data transfer from the conversion requesting computer to the computer connected to the converter retrieval unit 16 to the control unit 20.

The control unit 20 is connected to the computer 14-A. Only one control unit 20 is provided on the network 12. The control unit 20 monitors whether interprocessing between the plurality of computers, converter retrieval unit 16, and sequential processing of the data base 18-A are smoothly executed, or not, and also controls the respective sections. If only one control unit with such a function exists on the network 12, that function may be combined with other functions.

Figure 7:
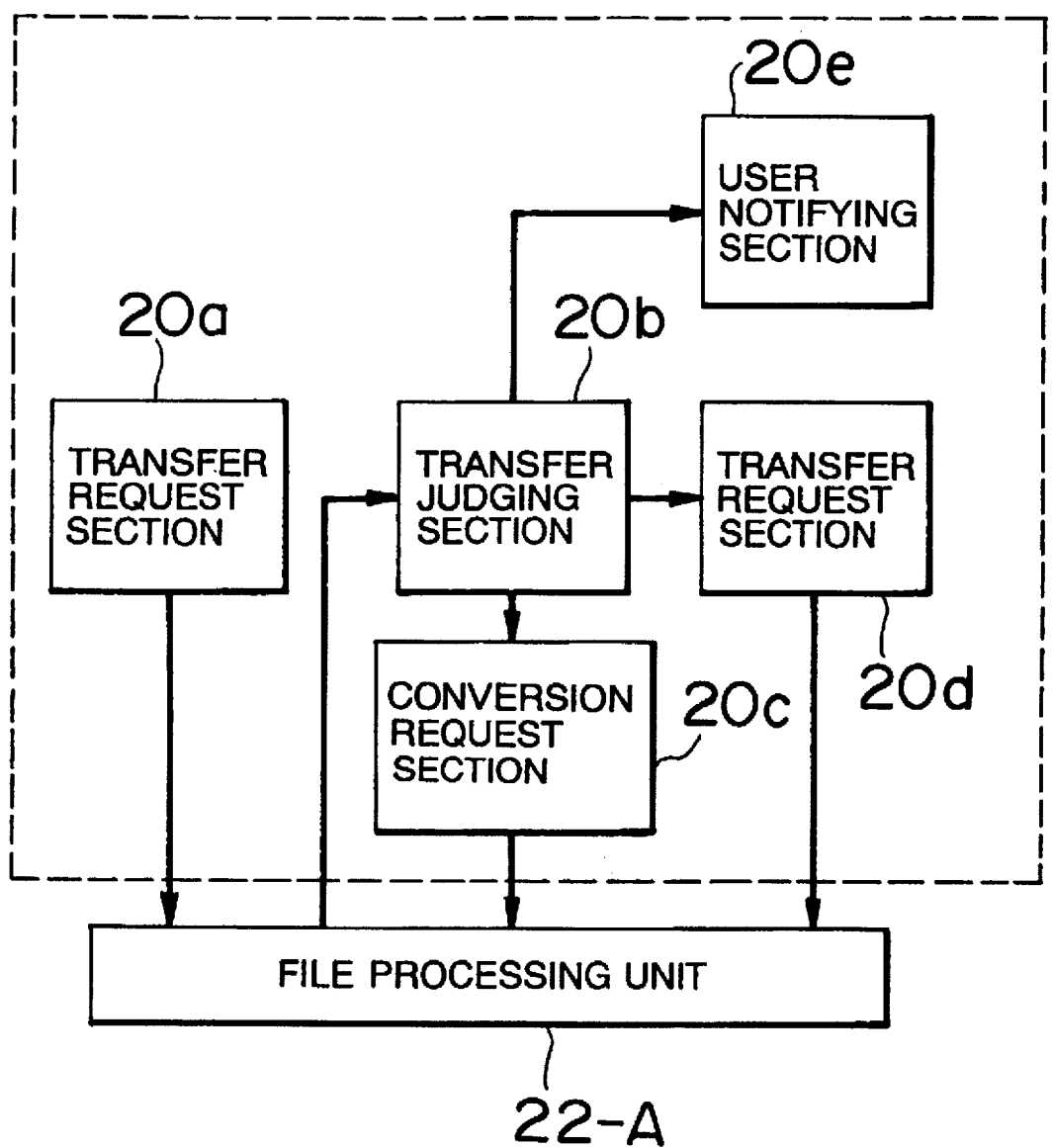
FIG. 7 is a structural block diagram showing a control unit.

FIG. 7 is a structural block diagram showing the control unit 20. The control unit 20 includes a transfer request section 20a, a transfer judging section 20b, a conversion request section 20c, a transfer request section 20d, and a user notifying section 20e.

The transfer request section 20a requests the file processing unit 22-A so as to transfer data to be converted to the computer equipped with the converter 26. The transfer judging section 20b judges whether transfer of data to be converted to the computer equipped with the converter 26 by the file processing unit 22-A succeeded or not. The conversion request section 20c, when the transfer of data to be converted succeeded, requests the file processing unit to convert data.

The transfer request section 20d requests the file processing unit to transfer converted data to a certain computer which is a request position. The user notifying section 20e notifies the user of the success or failure result of data transfer.

The respective computers 14-A to 14-D are connected with the corresponding file processing units 22-A to 22-D in the one-to-one manner. The respective file processing units 22-A to 22-D perform file transfer or data conversion. The data conversion is executed on the basis of the results obtained by the converter retrieval unit 16. The file transfer is executed by making the file processing unit for the computer with the converter 26 in cooperation with the converter retrieval unit 16 to which data will be transmitted. As the file transfer method, there are, for example, a method of transmitting the file in the form of communication data format and a method of using NFS of UNIX (Network File System). These methods are employed depending upon the properties of the respective computers.

Connected to the computer 14-D is a system information retrieval unit 24 which is connected with the data base 18b. The data base 18b includes a system information table 19c which stores, as system information for each computer on the network, such information as a code name, a device, display, display colors, image data, a temporary retention region, etc.

The code name represents the kinds of character codes such as EUC, jis, sjis, etc. The device represents a device belonging to its computer, for example, a floppy disc, a cartridge tape, etc. The display represents a bit map display, a dumb terminal, etc. The number of the display colors is, for example, 256 colors, 2 colors, etc. The image data format represents the format of display image data such as tiff, giff, etc. The temporary retention region represents a retention place for a computer which requests conversion. Besides this, the region may store system information of a communication system such as TCP/IP (Transmission Control Protocol/Internet Protocol), etc.

One system information retrieval unit 24 is provided on the network. The system information retrieval unit 24 retrieves system information inherent to the computer from the data base 18b which stores system information.

The system information retrieval units 24 may be provided every computer on the network 12.

Figure 9:
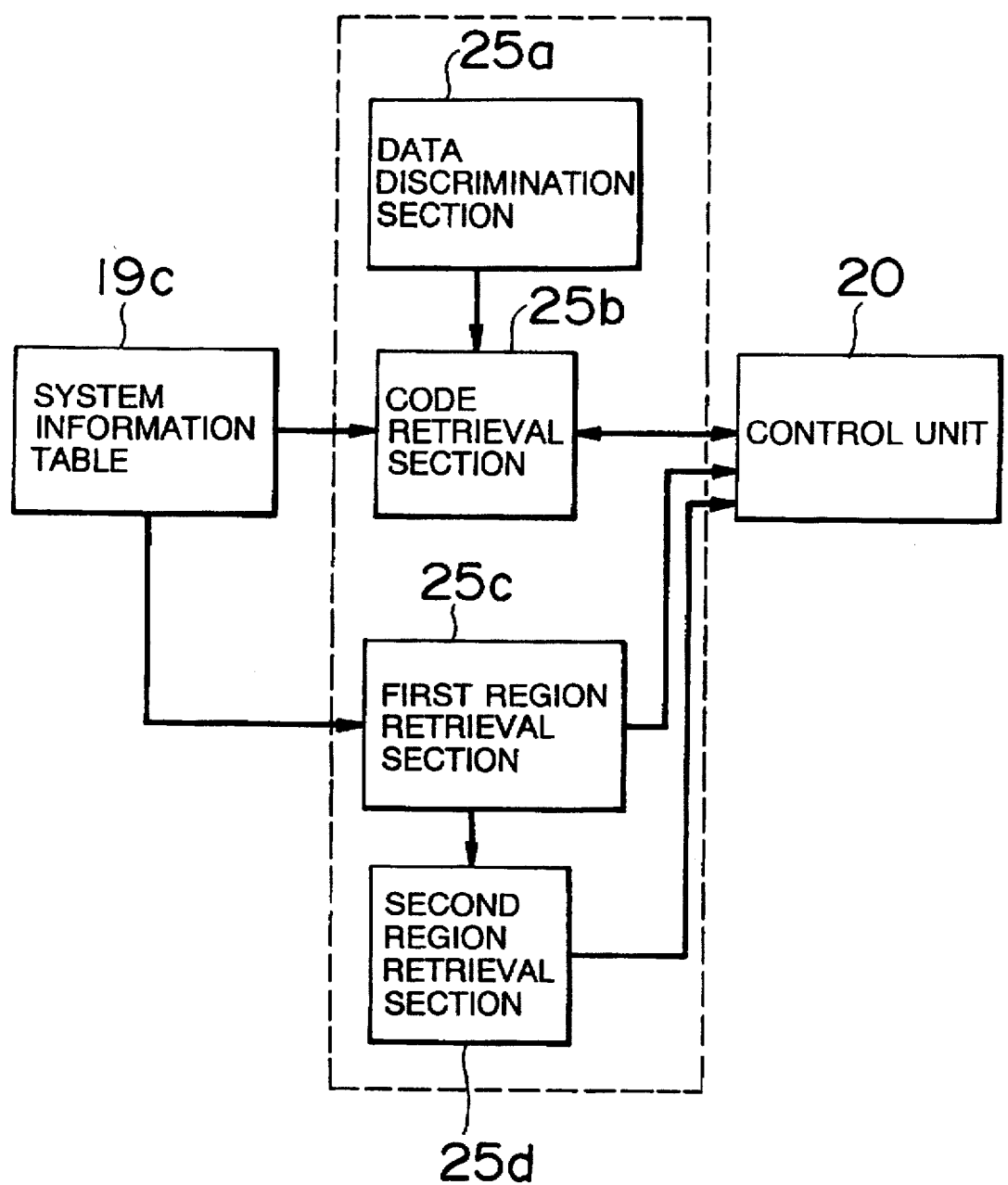
FIG. 9 is a structural block diagram showing a system information retrieval unit.

FIG. 9 is a structural block diagram showing the system information retrieval unit 24. The system information retrieval unit 24 includes a data judging section 25a, a code retrieval section 25b, a first region retrieval section 25c, and a second region retrieval section 25d. The data judging section 25a, when the data type judging section 16a has judged that there is no type of converted data, judges whether data to be converted is text, image data or other data.

The code retrieval section 25b retrieves the code name of the computer 14-B which requests conversion from the system information table 19c. The code retrieval section 25b, when there is no sort of display image data for the computer which requests conversion, refers to the system information table 19c to thereby retrieve the sort of image data fitted for the number of display colors.

The first region retrieval section 25c, when the data type Judging section 16a judges that there is no place of converted data, has judged whether the temporary retention region of the conversion requesting computer can be retrieved from the system information table 19c, or not. The first region retrieval section 25c, when the temporary retention region has been retrieved, returns the computer name and the existing place to the converter retrieval unit.

The second region retrieval section 25d, when the temporary retention region is not retrieved, retrieves the temporary retention region of the computer connected to the converter retrieval unit 16 to thereby return the computer name and the existing place to the converter retrieval unit 16.

The sort of the computer is not limited on the premise that the network 12 is supported. Further, the communication system is not limited, and, for example, TCP/IP, etc. in the case of UNIX.

The data conversion method according to the second embodiment of the invention will be described.

(1) Converter Retrieval Processing

Figure 10:
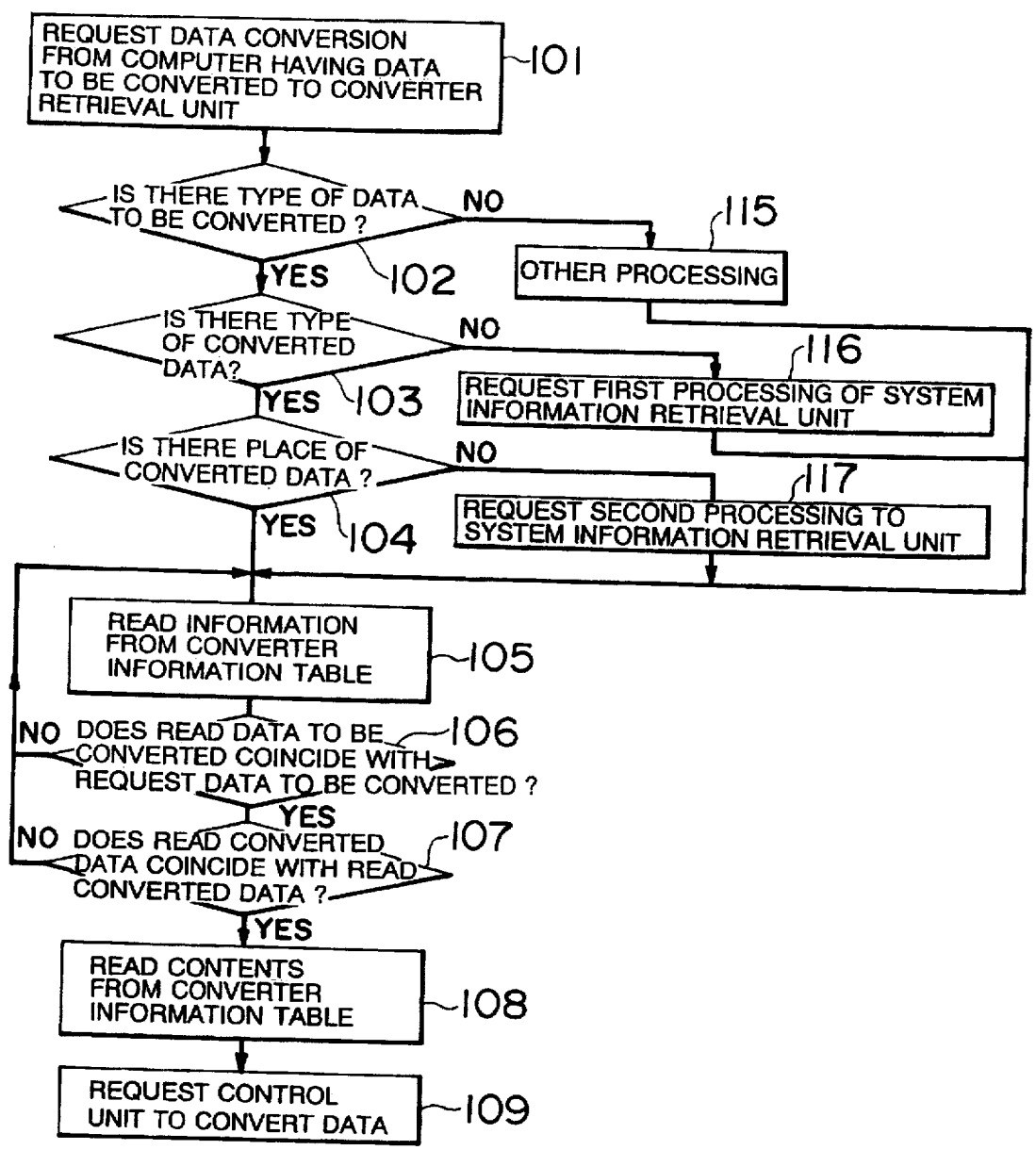
FIG. 10 is a flowchart showing the processing of the converter retrieval unit.

First, the processing of the converter retrieval unit will be described. FIG. 10 is a flowchart showing the processing of the converter retrieval unit in the second embodiment. In this case, it is assumed, for example, that data to be converted exists in the computer 14-B, the computer requesting conversion is the computer 14-B, and the converter 26 belongs to the computer 14-C.

First, the computer having the data to be converted issues a conversion request to the converter retrieval unit 16 (Step 101). In this case, the computer 14-B issues the conversion request to the converter retrieval unit 16 of the computer 14-A. At this time, the computer 14-B outputs to the converter retrieval unit 16, conversion conditions including the type of data to be converted, the type of converted data, a place of converted data, and the like.

Subsequently, the data type Judging section 16a provided within the converter retrieval unit 16 judges whether there exists the type of data to be converted, or not (Step 102). In the case where there exists the type of data to be converted, the data type judging section 16a judges whether the type of converted data exists or not (Step 103).

Further, in the case where there exists the type of converted data, the data type judging section 16a judges whether the place of converted data exists, or not (Step 104). The data read section 16b, when there exists the place of converted data, reads information on the name of data to be converted and the name of converted data from the converter information table 19a (Step 105).

Furthermore, the data coincidence section 16c judges whether read data to be converted coincides with requested data to be converted, or not (Step 106). In the case where the read data to be converted coincides with the requested data to be converted, the data coincidence section 16c judges whether read converted data coincides with converted data, or not (Step 107). When the read data to be converted and the read converted data do not coincide with the requested data to be converted and the requested converted data, control returns to Step 105, and repeatedly performs the processing.

In the case where the read data to be converted and the read converted data coincide with the requested data to be converted and the requested converted data, the conversion request section 16d reads, from the converter information table 19a, information such as the conversion command name, the assigned computer, the existing place, the use way and the like corresponding data to be converted and converted data (Step 108). The conversion request section 16d requests the data conversion of the control unit 20 with those information (Step 109).

Figure 11:
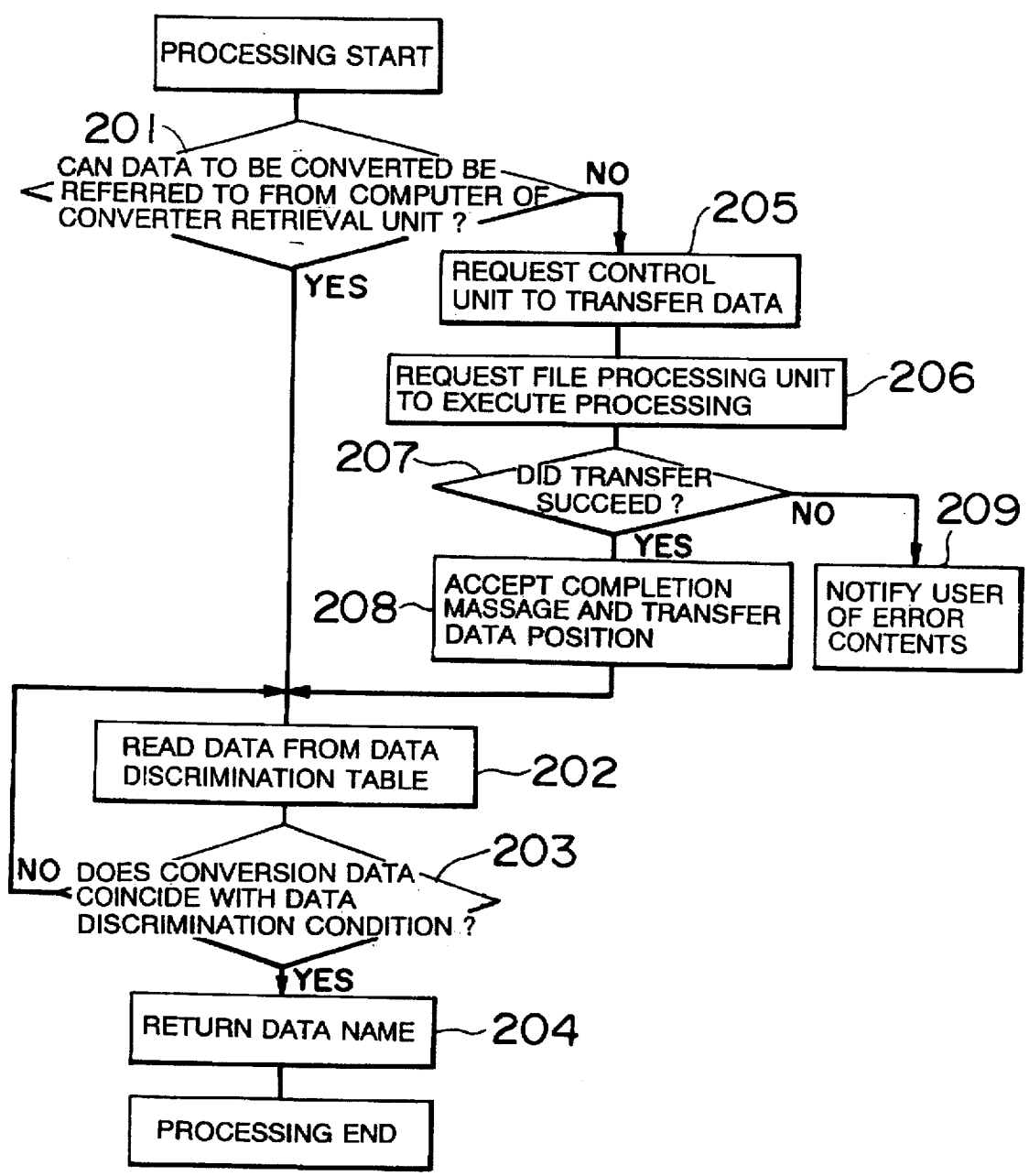
FIG. 11 is a flowchart showing other processing of the converter retrieval unit.

On the other hand, when there exists no type of data to be converted in Step 102, the converter retrieval unit 16 performs other processing (step 115). Next, other processing shown in FIG. 11 will be described. First, processing starts, and the data reference section 16e judges whether data to be converted can be referred to from the computer connected to the converter retrieval unit 16, or not (Step 201). In this case, the computer 14-A judges whether data of the computer 14-B can be referred to, or not.

The data read section 16f, when data to be converted can be referred to, reads data from the data discrimination table 19b (Step 202).

Subsequently, the data discrimination section 16h judges whether data to be converted coincides with the data discrimination condition, or not (Step 203). When data to be converted coincides with the data discrimination condition, the data name is returned to the converter retrieval unit 16 (Step 204), to thereby complete the processing. When data to be converted does not coincide with the data discrimination condition, control returns to Step 202, thereby executing the processing of Steps 202 to 203.

On the other hand, when data to be converted cannot be referred to in Step 201, the data transfer request section 16g requests data transfer from the computer 14-B to the computer 14-A of the control unit 20 (Step 205). Then, the control unit 20 requests transfer processing from the computer 14-B to the computer 14-A of the file processing units 22 (Step 206). The control unit 20 judges whether data transfer made by the file processing unit 22 has succeeded, or not (Step 207).

The computer 14-A, when data transfer has succeeded, accepts a transfer completion message and a transfer data position (Step 208), and then performs the processing of Step 202. When data transfer has failed, the computer 14-A notifies the user of error contents (Step 209).

(2) System Information Retrieval Processing

Figure 12:
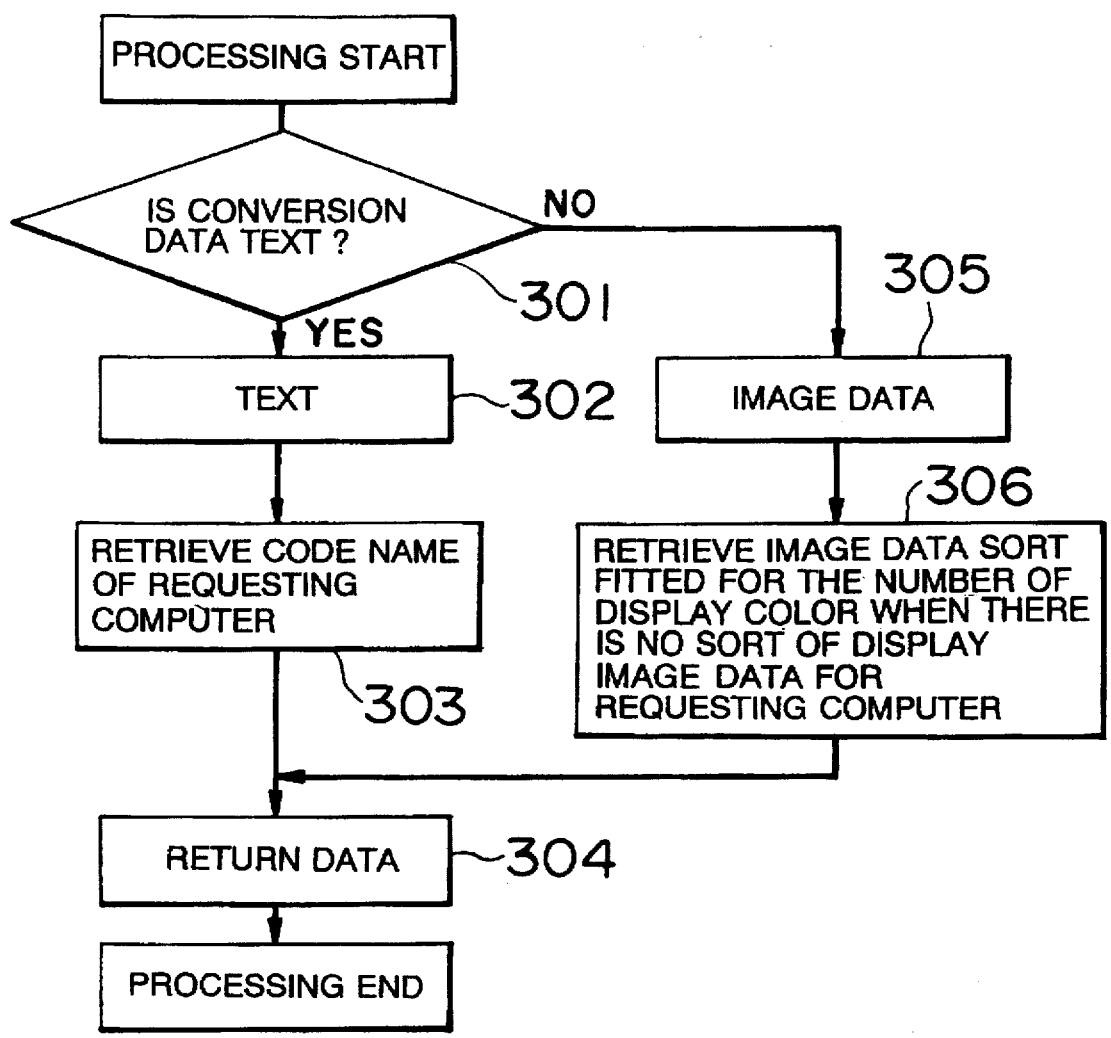
FIG. 12 is a flowchart showing the first processing of the system information retrieval unit.

The processing of the system information retrieval unit 24 will be described. When there exists no type of converted data in Step 103, a request for the first processing is given to the system information retrieval unit 24 (Step 116). FIG. 12 is a flowchart showing the first processing of the system information retrieval unit 24.

First, a text judging section 25a judges whether conversion data represents a text, image data or other data (Step 301).

When the conversion data represents a text (Step 302), the code retrieval section 25b retrieves the code name of the computer 14-B, which is a requesting machine, from the system information table 19c. Then, the section 25b returns the data name of the contents from the code name to the converter retrieval unit 16 (Step 304), to thereby complete the processing.

On the other hand, when the conversion data is image data and there is no sort of display image data for the requesting computer (Step 305), the code retrieval section 25b refers to the system information table 19c to thereby retrieve the sort of image data fitted for the number of display colors (Step 306). Thereafter, the section 25b returns the data name of its contents to the converter retrieval unit 16 to complete the processing.

Figure 13:
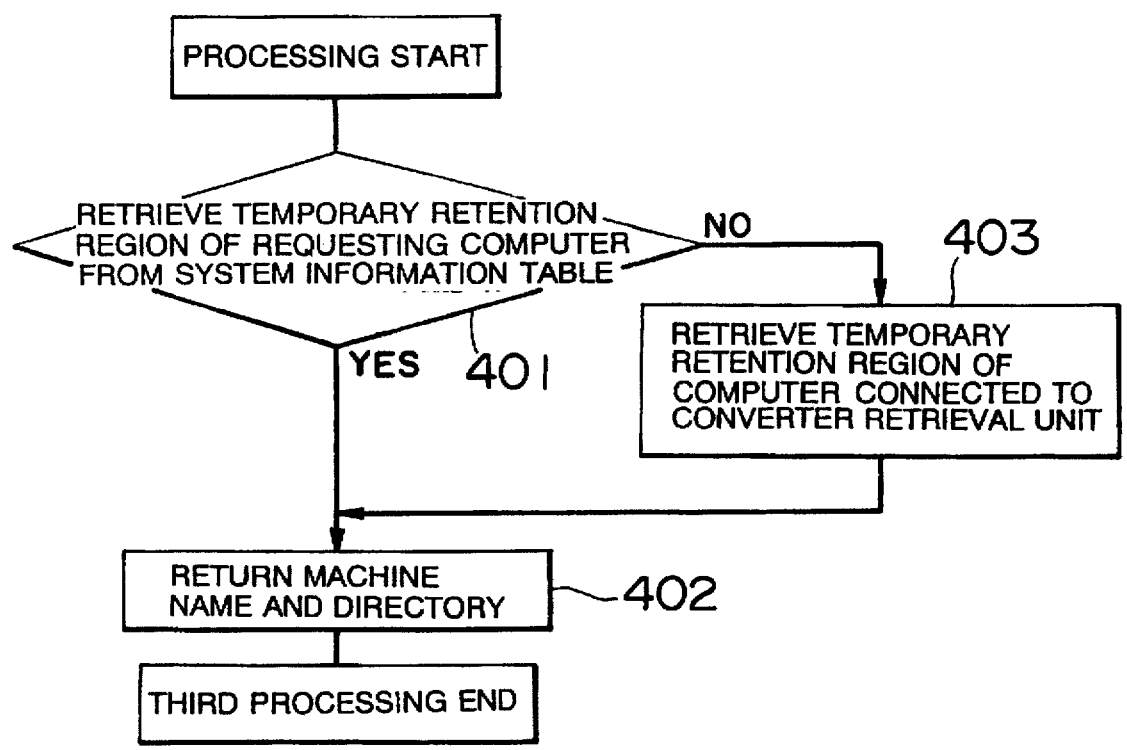
FIG. 13 is a flowchart showing the second processing of the system information retrieval unit.

Furthermore, when there is no place of converted data in Step 104, a request for the second processing is given to the system information retrieval unit 24 (Step 117). Subsequently, the second processing of the system information retrieval unit 24 shown in FIG. 13 will be described.

First, the first region retrieval section 25c judges whether the temporary retention region of the requesting computer can be retrieved from the system information table 19c, or not (Step 401).

The first region retrieval section 25c, when the temporary retention region of the requesting computer has been retrieved, returns the computer name and a directory to the converter retrieval unit 16 (Step 402). When the temporary retention region has not been retrieved, the second region retrieval section 25d retrieves the temporary retention region of the computer 14-A connected to the converter retrieval unit 16 (Step 403), to thereby return the computer name and the directory to the converter retrieval unit 16 (Step 404).

(3) Processing of Control Unit 20

Figure 14:
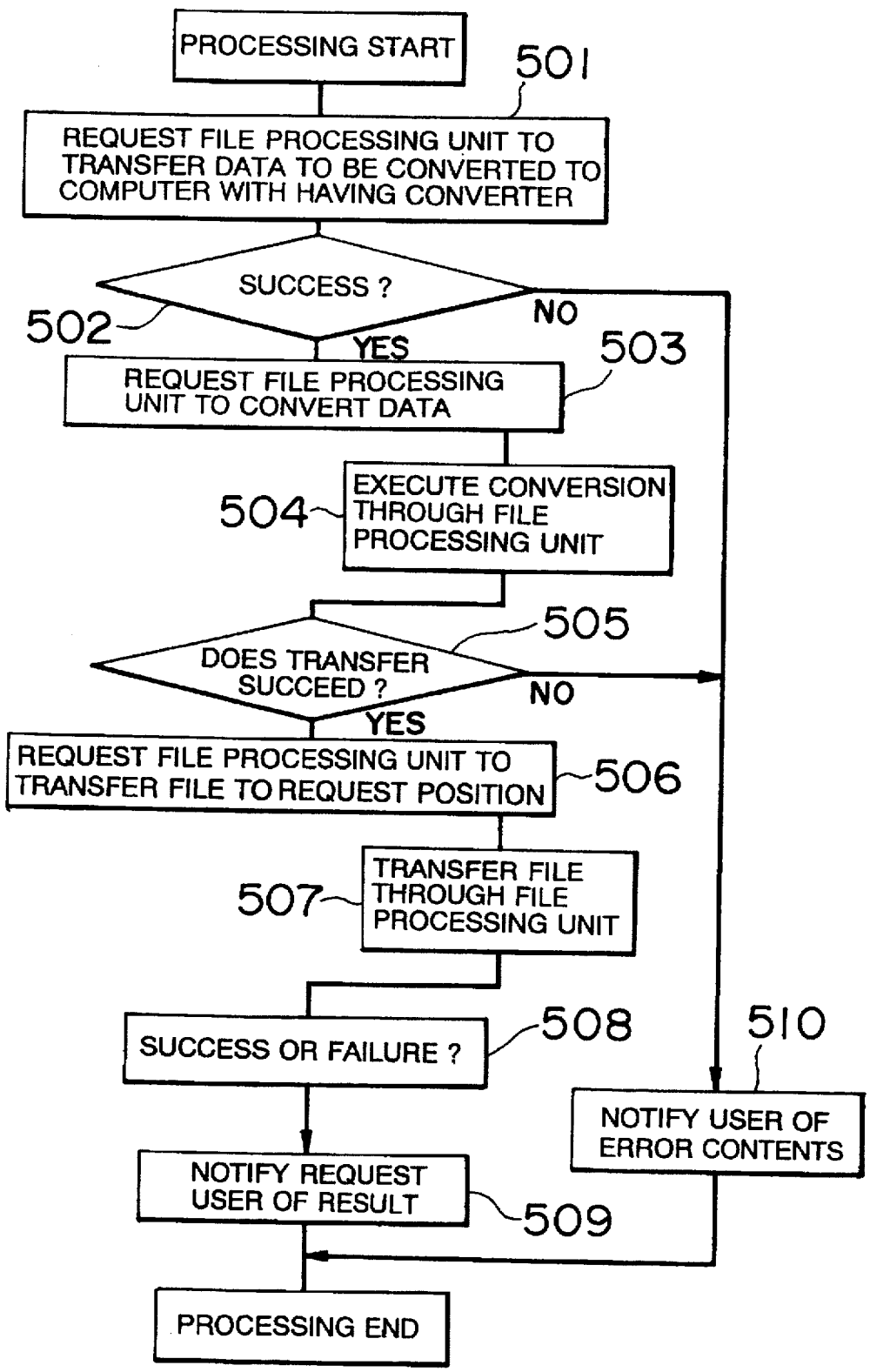
FIG. 14 is a flowchart showing the processing of the control unit.

Referring to FIG. 14, the processing of the control unit 20 will be described. First, when the computer gives a conversion request to the control unit 20, then the transfer request section 20a requests the file processing unit 22 to transfer data to be converted to the computer equipped with the converter (Step 501). In this case, the transfer request section 20a requests the file processing unit 22-A to transfer data to be converted to the computer 14-C.

The transfer judging section 20b judges whether transfer of data to be converted to the computer 14-C by the file processing unit 22-A has succeeded, or not (Step 502). When data transfer has succeeded, the conversion request section 20c requests the file processing unit 22-C to perform data conversion (Step 503).

Subsequently, the file processing unit 22-C allows the converter 26 connected to the computer 14-C to perform data conversion from data to be converted to converted data (Step 504). For example, a TIFF file is converted into a GIFF file, or the GIFF file is converted into the TIFF file. The transfer judging section 20b judges whether its data conversion has succeeded, or not (Step 505).

When data conversion has succeeded, the transfer request section 20d requests the file processing unit 22-C so as to transfer data to the computer 14-B (Step 506). Thereafter, the file processing unit 22-C transfers data to the computer 14-B (Step 507).

Sequentially, the transfer judging section 20b judges whether the data transfer has succeeded or failed (Step 508). Then, the user notifying section 20e notifies the requesting user of the result of data transfer success or failure (Step 509).

On the other hand, when the transfer judging section 20b judges the failure of transfer in Step 502, or when it judges the failure of data conversion, the user notifying section 20e notifies the user of the error contents.

As was described above, according to the second embodiment, automatic data conversion unit is realized thereby facilitating common use of data. Further, the user himself is unnecessary to understand the use way of the converter 26, resulting in reduction of user's work. Also, since the existing converter 26 can be used, the apparatus is lowered in costs.

The present invention is not limited to or by the above-mentioned first and second embodiments. In the first and second embodiments, there is provided only one converter retrieval unit 16 to achieve concentrated control. For example, the converter retrieval units 16 may be provided every computer 14 so as to perform control by the respective system information retrieval units 24.

Furthermore, information stored in the data bases 18a and 18b is not limited to or by the first and second embodiments. Instead, plural kinds of information may be stored therein.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A data conversion apparatus for converting data having a first format into data having a second format on a network having a plurality of computers connected thereto, said data conversion apparatus comprising:

a converter installed in at least one computer;

storage means for storing a plurality of information regarding said converter said storage means comprising:

converter information means for storing information representing a sort of data including a name of data to be converted and a name of converted data, an assigned computer entering a conversion command therein, an existing place and a use way; and data discriminating information means for storing a correspondence of a discriminating condition for discriminating a kind of data to a data name;

retrieval means for retrieving the plurality of information regarding a converter from said storage means according to a conversion request from a computer requesting data conversion;

conversion processing means connected to said computers for causing said converter to convert data having one format into data having a second format the basis of the information retrieved by said retrieval means; and control means for controlling said retrieval means and said conversion processing means to output converted data to the computer requesting data conversion.

2. A data conversion apparatus as claimed in claim 1, wherein the computer requesting data conversion outputs a conversion condition for data conversion to said retrieval means; and wherein said retrieval means comprises:

data type judging means for judging whether at least one of a type of data exists to be converted, whether a type of converted data exists and whether a place of converted data in the conversion condition from the computer which requests data conversion exists;

data read means for reading a name of data to be converted and a name of converted data, from said converter information means, when the type of data to be converted exists and the type of converted data exists in the conversion condition;

data coincidence means for judging whether the name of data to be converted and the name of converted data coincide with the type of data to be converted and the type of converted data requested from said computer requesting conversion; and conversion request means for reading information regarding a conversion command from said converter information means to request data conversion of said control means with said information when the read data coincides with the requested data.

3. A data conversion apparatus as claimed in claim 2, further comprising system information storage means for storing system information on the network and a plurality of computers; and system information retrieval means for retrieving the system information from said system information storage means.

4. A data conversion apparatus as claimed in claim 3, wherein said system information storage means stores, as system information for each computer on said network, information on at least one of character codes, devices, displays, display colors, display image data formats, and temporary retention regions.

5. A data conversion apparatus as claimed in claim 4, wherein said system information retrieval means comprises judging means for judging the format data to be converted when said data type judging means judges that the type of converted data does not exist; and information retrieval means for retrieving contents corresponding to the judged result of said judging means from said system information means to return the contents to said retrieving means.

6. A data conversion apparatus as claimed in claim 3, wherein said system information retrieving means comprises;

first region retrieval means for, when said data type judging means judges that the place of data does not exist, retrieving a temporary retention region of said computer requesting data conversion from said system information means, and when the temporary retention region is retrieved, and returning the computer name and the existing place to said retrieval means; and second region retrieval means for, when said temporary retention region has not been retrieved, retrieving the temporary retention region of the computer connected to said retrieval means, and returning the computer name and the existing place to said retrieval means.

7. A data conversion apparatus as claimed in claim 2, wherein said retrieval means comprises:

data reference means for judging when said data type judging means judges that the type of data to be converted does not exist, whether data to be converted is capable of being referred to from the computer connected to said retrieval means;

data read means for reading data from said data discriminating information means when data to be converted is capable of being referred to;

data judging means for judging whether data to be converted coincides with the data discrimination condition; and a transfer request means for requesting said control means to transfer data from said computer requesting data conversion to said computer connected to said retrieval means when data to be converted is not capable of being referred to.

8. A data conversion apparatus as claimed in claim 1, wherein said conversion processing means connected to the computer having said converter among said plurality of conversion processing means performs data conversion on the basis of said retrieved result.

9. A data conversion apparatus as claimed in claim 2, wherein said control means comprises a transfer request means for requesting said conversion processing means to transfer data to be converted to said computer having said converter;

transfer judging means for judging whether transfer of data to be converted to said computer by said conversion processing means has succeeded;

data conversion request means for requesting data conversion of said conversion processing means when data transfer has succeeded; and transfer request means for requesting said conversion processing means to transfer data to said computer which requests data conversion.

10. A data conversion method of converting data having a first format into data having a second format on a network to which a plurality of computers are connected, said method comprising the steps of:

storing, in a converter information table, information on a name of data to be converted and a converted data name both representing sorts of data, a conversion command, an assigned computer entering a conversion command therein, an existing place and a use way; and storing, in a data discrimination table, a correspondence of a discrimination condition for discriminating the sort of data to the data name;

retrieving the information from the converter information table according to a conversion request from a computer which requests data conversion;

converting data having a first format into data having a second format on the basis of the retrieved information; and controlling retrieval processing and conversion processing to output converted data to a computer which requested the data conversion.

11. A data conversion method as claimed in claim 10, wherein the step of retrieving the information comprises the steps of:

determining whether there exists at least one of the type of data to be converted, determining whether the type of converted data exists, and determining whether the place of converted data in the conversion condition from the computer which requests data conversion exists;

reading the name of data to be converted and the name of converted data from said converter information table, when there exists the type of data to be converted and the type of converted data in the conversion condition;

determining whether the name of data to be converted and the name of converted data coincide with the type of data to be converted and the type of converted data requested from said computer requesting conversion; and reading information on conversion command from said converter information table when the read data coincides with the requested data to request conversion according to the information.

12. A data conversion method as claimed in claim 11, further comprising the steps of storing system information on a system which includes the network and the plurality of computers; and retrieving the system information from said system information table.

13. A data conversion method as claimed in claim 12, wherein said system information storing step stores, as system information for each computer on said network, information on at least one of character codes, devices, displays, display colors, display image data formats, and temporary retention regions.

14. A data conversion method as claimed in claim 13, wherein said system information retrieval step comprises the steps of:

judging which format data to be converted belongs to when the type of converted data does not exist; and retrieving contents corresponding to the judged result from said system information table to return the contents to said retrieving step.

15. A data conversion method as claimed in claim 12, wherein said system information retrieving step, comprising the steps of:

when the place of data does not exist, retrieving a temporary retention region of said computer requesting data conversion from said system information table, and when the temporary retention region is retrieved, returning the computer name and the existing place to said retrieval step; and when said temporary retention region has not been retrieved, retrieving the temporary retention region of the computer connected to said retrieving step, returning the computer name and the existing place to said retrieving step.

16. A data conversion apparatus as claimed in claim 11, wherein said retrieval step comprising the steps of:

when the type of data to be converted does not exist, judging whether data to be converted is capable of being referred to from the computer for retrieval of the converter;

reading data from said data discrimination table when data to be converted is capable of being referred to;

judging whether data to be converted coincides with the data discrimination condition; and requesting said control step to transfer data from said computer requesting data conversion to said computer related to said retrieval of the converter when data to be converted is not capable of being referred to.

17. A data conversion method as claimed in claim 11, wherein said control step comprises the steps of:

requesting said conversion step to transfer data to be converted to said computer having said converter;

judging whether transfer of data to be converted to said computer by said conversion step has succeeded;

requesting data conversion of said conversion step when data transfer has succeeded; and requesting said conversion step to transfer data to said computer which requests data conversion.

\* \* \* \* \*